United States Patent
Hsieh et al.

(10) Patent No.: US 7,130,011 B2
(45) Date of Patent: Oct. 31, 2006

(54) IPS TYPE LIQUID CRYSTAL DISPLAY WITH PROTRUSIVE ELECTRODES

(75) Inventors: Tsau-Hua Hsieh, Miao-Li (TW); Jia-Pang Pang, Miao-Li (TW); Cheuh-Ju Chen, Miao-Li (TW)

(73) Assignee: Innolux Display Corp., Miao-Li (TW)

( * ) Notice: Subject to any disclaimer, the term of this patent is extended or adjusted under 35 U.S.C. 154(b) by 96 days.

(21) Appl. No.: 10/818,654

(22) Filed: Apr. 5, 2004

(65) Prior Publication Data
US 2004/0196425 A1  Oct. 7, 2004

(30) Foreign Application Priority Data
Apr. 4, 2003  (TW) ............... 92107715 A

(51) Int. Cl.
G02F 1/1337 (2006.01)
G02F 1/1343 (2006.01)
G02F 1/1339 (2006.01)

(52) U.S. Cl. .............. 349/141; 349/129; 349/156

(58) Field of Classification Search ............ 349/141, 349/129, 156
See application file for complete search history.

(56) References Cited

U.S. PATENT DOCUMENTS

| 5,598,285 A | 1/1997 | Kondo et al. | |
| 5,986,735 A | 11/1999 | Komatsu | |
| 6,351,300 B1* | 2/2002 | Park et al. | 341/141 |
| 6,573,965 B1* | 6/2003 | Liu et al. | 349/129 |
| 2002/0033927 A1* | 3/2002 | Mun et al. | 349/156 |
| 2002/0039166 A1* | 4/2002 | Song | 349/156 |

* cited by examiner

*Primary Examiner*—Huyen Ngo
(74) *Attorney, Agent, or Firm*—Wei Te Chung

(57) ABSTRACT

An IPS (in-plane switching) liquid crystal display has a color filter substrate (3), a TFT (thin film transistor) substrate (8), and a liquid crystal layer (7) interposed therebetween. The TFT substrate includes a TFT plate (5), a protrusion layer (6), and an electrode matrix. The electrode matrix includes a plurality of transversely disposed gate lines (22), a plurality of longitudinally disposed data lines (21), switching elements, a plurality of common electrodes (27), and a plurality of pixel electrodes (28). The protrusion layer has a plurality of protrusion portions (61). The common and pixel electrodes are formed on the protrusion portions in one-to-one correspondence to provide an array of protrusive electrodes that generate a strong and highly uniform parallel electric field. This provides better picture quality, and can lower power consumption and/or yield a higher aperture ratio.

16 Claims, 4 Drawing Sheets

IPS TYPE LIQUID CRYSTAL DISPLAY WITH PROTRUSIVE ELECTRODES

BACKGROUND OF THE INVENTION

1. Field of the Invention

The present invention relates to an in-plane switching liquid crystal display (IPS LCD).

2. Description of Prior Art

A conventional liquid crystal display which employs twisted nematic control of liquid crystal molecules is burdened with the inherent problem of a narrow viewing angle. In order to overcome this problem, IPS liquid crystal displays have been developed. In such LCDs, an electric field applied to the liquid crystal molecules is generated in a plane parallel to a main substrate of the LCD.

FIG. 4 is a schematic, side cross-sectional view of a conventional IPS liquid crystal display 1. FIG. 5 is a top elevation of the LCD 1 corresponding to FIG. 4. As illustrated, the LCD 1 comprises a color filter substrate 10, a TFT (thin film transistor) substrate 12, a liquid crystal layer 14 interposed between the substrates 10, 12, and spacers 20 disposed between the substrates 10, 12 for supporting the LCD 1 and maintaining the space between the substrates 10, 12. A plurality of data lines 11 and gate lines 13 is formed on the TFT substrate 12 in longitudinal and transverse directions respectively, and the data and gate lines 11, 13 cooperatively form a plurality of pixel units arranged in a matrix. A plurality of common electrodes 17 and pixel electrodes 18 each having comb-shaped parts is formed on the TFT substrate 12. Arrow Z shows an upward direction perpendicular to the TFT substrate 12.

Referring to FIG. 6, in operation, when a voltage is applied to the common electrodes 17 and pixel electrodes 18, an electric field parallel to the color filter substrate 10 and the TFT substrate 12 is generated therebetween. Liquid crystal molecules in the liquid crystal layer 14 are oriented in accordance with the electric field to provide bright illumination for the LCD 1.

However, the electric field in the liquid crystal layer is not an ideal parallel electric field. Rather, it is arch-shaped, and decreases in strength along direction Z. Even liquid crystal molecules that are equidistant from the TFT substrate 12 are driven by a varying electric field, such that these liquid crystal molecules have different orientations relative to each other. This variation in orientations reduces the clarity of the display of the LCD 1; that is, the picture quality is lowered. In addition, liquid crystal molecules far from the TFT substrate 12 are driven by weaker portions of the electric field than those near the TFT substrate 12. Accordingly, to obtain an electric field strong enough to drive all the liquid crystal molecules, the LCD 1 needs a high driving voltage and/or small spaces between adjacent common and pixel electrodes 17, 18. This results in high power consumption and/or a low aperture ratio.

It is desired to provide an IPS liquid crystal display which overcomes the above-described deficiencies.

SUMMARY OF THE INVENTION

An object of the present invention is to provide an IPS liquid crystal display which enables good picture quality, a low driving voltage, and/or a high aperture ratio.

An IPS liquid crystal display of the present invention comprises a color filter substrate, a TFT substrate, and a liquid crystal layer interposed between the substrates. The TFT substrate comprises a TFT plate, a protrusion layer disposed on the TFT plate and an electrode matrix. The protrusion layer comprises a plurality of protrusion portions. The electrode matrix comprises a plurality of common electrodes and pixel electrodes. The protrusion portions cooperate with common and pixel electrodes to form a plurality of protrusive electrodes arranged in a matrix.

When a voltage is applied to the common and pixel electrodes, an electric field is generated by the protrusive electrodes. The protrusive electrodes generate a more uniform parallel electric field, compared with a conventional LCD that has flat electrodes disposed below a liquid crystal layer and which generates an arch-shaped driving electric field. Accordingly, liquid crystal molecules in the liquid crystal layer of the present invention have more uniform orientations, and thus provide a better picture quality. In addition, the protrusive electrodes can generate a stronger electric field compared with the flat electrodes of the prior art when a same voltage is applied. Therefore the LCD of the present invention needs a lower driving voltage, and/or can provide larger spaces between adjacent electrodes. This yields lower power consumption and/or a higher aperture ratio.

Other objects, advantages, and novel features of the present invention will become more apparent from the following detailed description when taken in conjunction with the accompanying drawings, in which:

DETAILED DESCRIPTION OF THE INVENTION

Figure 1:
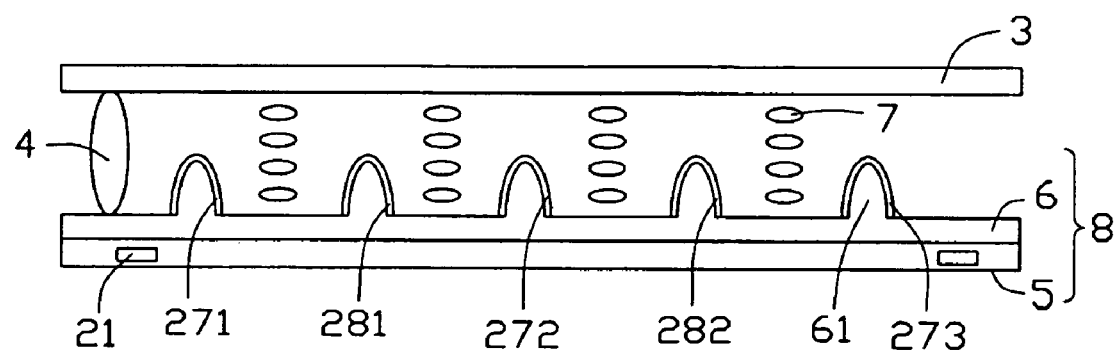
FIG. 1 is a schematic, side cross-sectional view of a pixel unit of an IPS LCD according to a preferred embodiment of the present invention.
Figure 2:
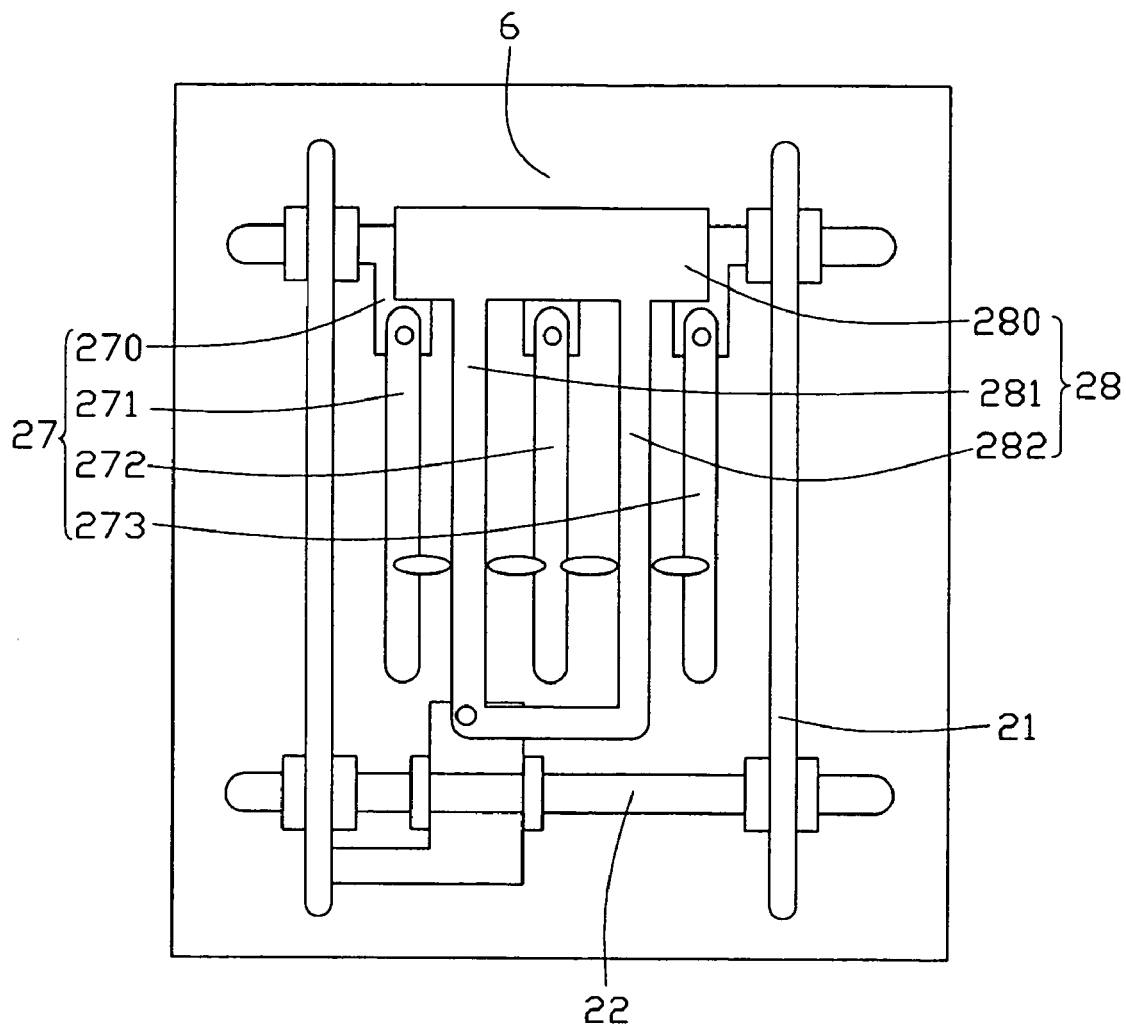
FIG. 2 is a schematic, top elevation of a lower portion only of the pixel unit of FIG. 1.

Referring to FIG. 1 and FIG. 2, an in-plane switching liquid crystal display (IPS LCD) according to the preferred embodiment of the present invention comprises a color filter substrate 3, a TFT substrate 8, a liquid crystal layer 7 comprising bar-shaped liquid crystal molecules (not labeled) interposed between the color filter and TFT substrates 3, 8, and spacers 4 disposed between the color filter and TFT substrates 3, 8 for supporting the two substrates 3, 8 and maintaining a space therebetween.

The TFT substrate 8 comprises a TFT plate 5, a protrusion layer 6 comprising a plurality of protrusion portions 61 protruding into the liquid crystal layer 7, and an electrode matrix. The protrusion portions 61 extend up to a level about halfway between the color filter and TFT substrates 3, 8. The electrode matrix comprises transversely disposed gate lines 22, longitudinally disposed data lines 21, switching elements (not labeled), a plurality of common electrodes 27, and a plurality of pixel electrodes 28. The data and gate lines 21, 22 cooperatively form a plurality of pixel units arranged in a matrix. One pixel unit comprises one common electrode 27 and one pixel electrode 28 for generating an electric field to drive the liquid crystal molecules of the pixel unit.

The common electrode 27 comprises a bar member 270 and three parallel comb members 271, 272, 273. The pixel electrode 28 comprises a bar portion 280, and two parallel comb portions 281, 282 interleavingly disposed between the comb members 271, 272, 273. The comb members 271, 272, 273 and comb portions 281, 282 are disposed on respective protrusion portions 61 in one-to-one correspondence, thereby forming five protrusive electrodes in the pixel unit. Liquid crystal molecules between each two adjacent protrusive electrodes are driven to have a certain orientation, which determines an amount of light emitted from the LCD.

Figure 3:
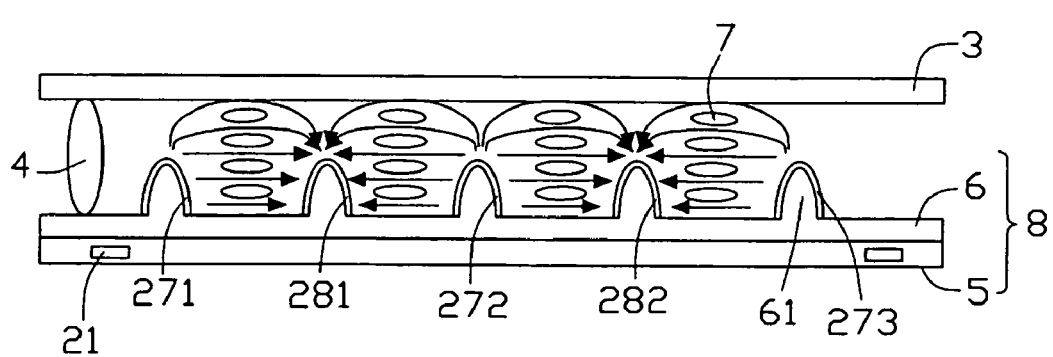
FIG. 3 is similar to FIG. 1, but showing an electric field distribution of the pixel unit in an on state.
Figure 4:
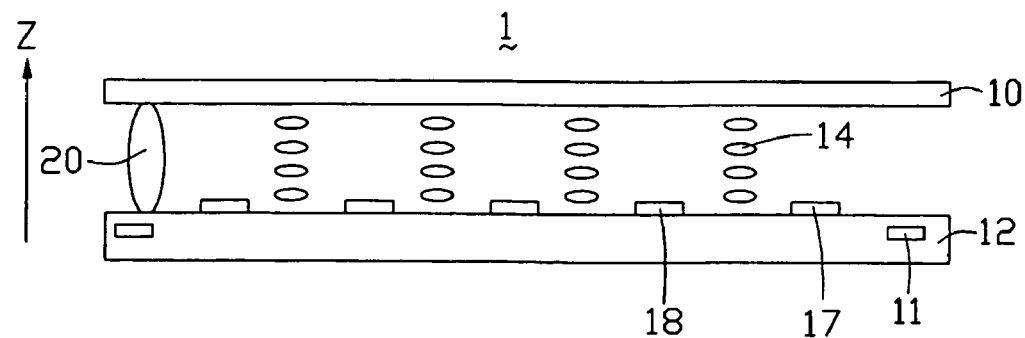
FIG. 4 is a schematic, side cross-sectional view of a pixel unit of an IPS LCD of the prior art.
Figure 5:
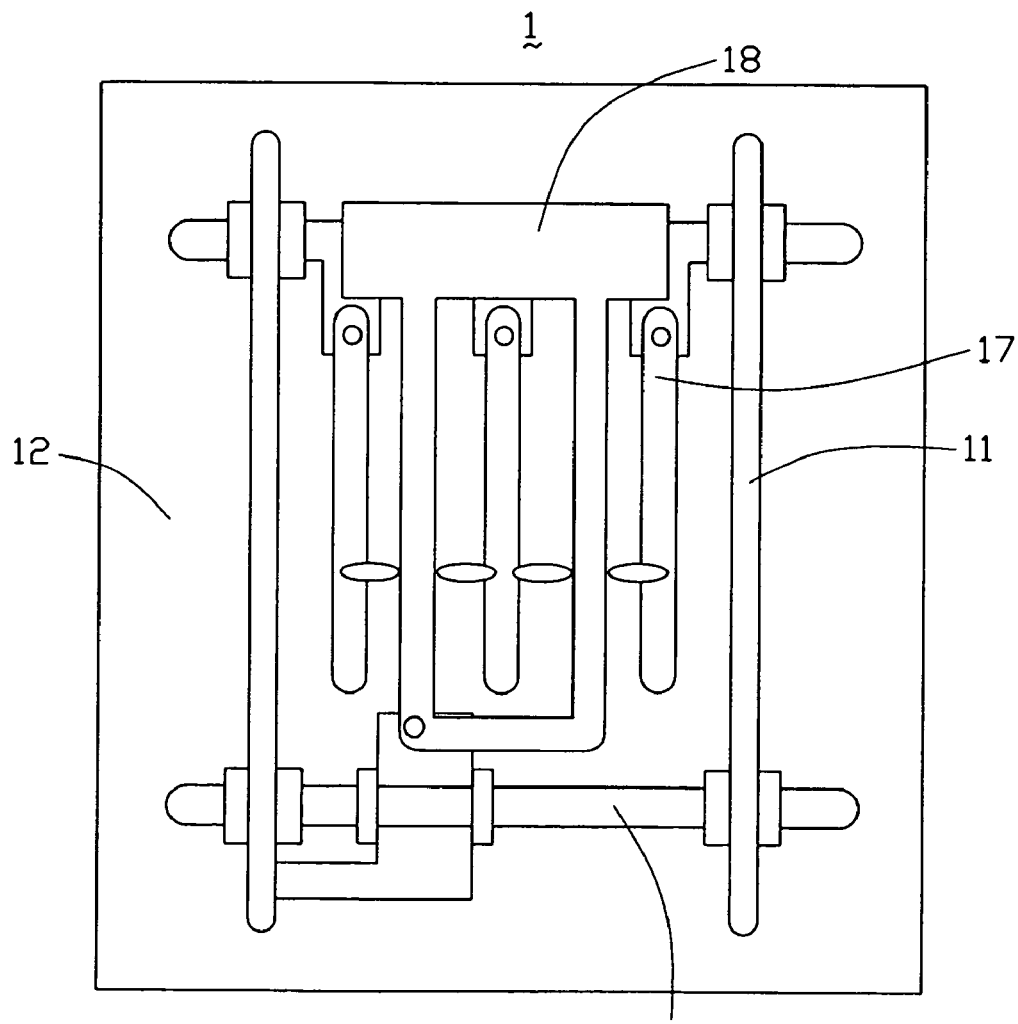
FIG. 5 is a schematic, top elevation of a lower portion only of the pixel unit of FIG. 4.
Figure 6:
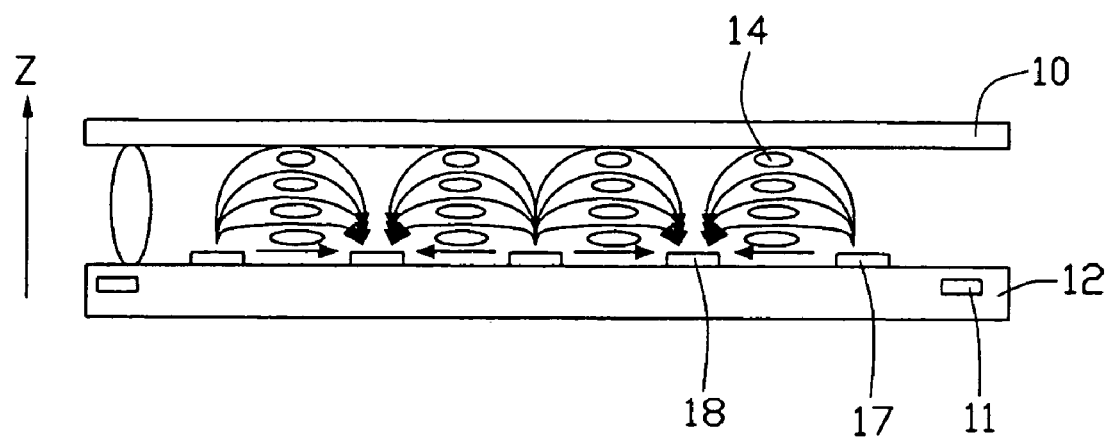
FIG. 6 is similar to FIG. 4, but showing an electric field distribution of the pixel unit in an on state.

Referring to FIG. 3, when a voltage is applied to the common electrodes 27 and pixel electrodes 28, an electric field is generated between the comb members 271, 272, 273 and the comb portions 281, 282. Because these electric field generators are protrusive, the electric field generated by them is more uniform and stronger than prior art electric fields obtained by employing flat electrodes. Accordingly, the liquid crystal molecules in the liquid crystal layer 7 have more uniform orientations and are driven more easily. Therefore, the LCD provides a better picture quality. In addition, the spaces between the comb members 271, 272, 273 and the comb portions 281, 282 can be increased, so that the LCD has a higher aperture ratio. Further or alternatively, a lower driving voltage can be used, so that the LCD has lower power consumption.

The color filter and TFT substrates 3, 8 can be made of glass or SiO$_2$ (silicon dioxide). The common electrodes 27 and the pixel electrodes 28 can comprise a transparent conductive material such as indium-tin oxide or a metal. The protrusion portions 61 may extend up to a level about halfway between the color filter and TFT substrates 3, 8.

It is also to be generally understood that even though numerous characteristics and advantages of the present invention have been set out in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

The invention claimed is:

1. An IPS (in-plane switching) liquid crystal display, comprising:
   a color filter substrate;
   a TFT (thin film transistor) substrate comprising a TFT plate, a protrusion layer and an electrode matrix, the electrode matrix comprising a plurality of transversely disposed gate lines, a plurality of longitudinally disposed data lines, and a plurality of switching elements; and
   a liquid crystal layer disposed between the two substrates;
   wherein the protrusion layer has a plurality of protrusion portions protruding into the liquid crystal layer and extending one half of a distance between the two substrates, and the electrode matrix further comprises a plurality of common electrodes and pixel electrodes formed on the protrusion layer.

2. The IPS liquid crystal display as claimed in claim 1, wherein the common electrodes and pixel electrodes have comb members and comb portions respectively.

3. The IPS liquid crystal display as claimed in claim 2, wherein the comb members and the comb portions are disposed on the protrusion portions in one-to-one correspondence.

4. The IPS liquid crystal display as claimed in claim 3, further comprising a plurality of spacers disposed between the color filter substrate and the TFT substrate.

5. The IPS liquid crystal display as claimed in claim 1, wherein the common electrodes and pixel electrodes comprise indium-tin oxide or metal.

6. An IPS (in-plane switching) liquid crystal display, comprising:
   a color filter substrate;
   a TFT (thin film transistor) substrate comprising a TFT plate, an array of protrusion portions and an electrode matrix; and
   a liquid crystal layer disposed between the two substrates;
   wherein the protrusion portions protrude into the liquid crystal layer and extend one half of a distance between the two substrates, and the electrode matrix comprises a plurality of common electrodes and pixel electrodes formed on the protrusion portions.

7. The IPS liquid crystal display as claimed in claim 6, wherein the common electrodes and pixel electrodes have comb members and comb portions respectively.

8. The IPS liquid crystal display as claimed in claim 7, wherein the comb members and the comb portions are formed on the protrusion portions in one-to-one correspondence.

9. The IPS liquid crystal display as claimed in claim 8, further comprising a plurality of spacers disposed between the color filter substrate and the TFT substrate.

10. The IPS liquid crystal display as claimed in claim 9, wherein the common electrodes and pixel electrodes comprise indium-tin oxide or metal.

11. An IPS (in-plane switching) liquid crystal display, comprising:
    a first substrate;
    a second substrate comprising a protrusion layer having a plurality of protrusion portions; and
    a liquid crystal layer comprising liquid crystal molecules interposed between the first and second substrates;
    wherein the protrusion portions protrude into the liquid crystal layer and extend one half of a distance between the first and second substrates, and a first electrode array and a second electrode array are formed on the protrusion portions for generating an electric field to drive the liquid crystal molecules.

12. The IPS liquid crystal display as claimed in claim 11, wherein the first electrode array and the second electrode array have comb members and comb portions respectively.

13. The IPS liquid crystal display as claimed in claim 12, wherein the comb members and the comb portions are disposed on the protrusion portions in one-to-one correspondence.

14. The IPS liquid crystal display as claimed in claim 13, further comprising a plurality of spacers disposed between the first substrate and the second substrate.

15. The IPS liquid crystal display as claimed in claim 14, wherein the first electrode array and the second electrode array comprise indium-tin oxide or metal.

16. An IPS (in-plane switching) liquid crystal display, comprising:
    a first substrate;
    a second substrate comprising a protrusion layer having a plurality of protrusion portions; and
    a liquid crystal layer comprising liquid crystal molecules interposed between the first and second substrates;

wherein the protrusion portions protrude into the liquid crystal layer and extend one half of a distance between the first and second substrates, a first electrode array and a second electrode array are provided on the second substrate for generating an electric field to drive the liquid crystal molecules, and at least one of said first electrode array and said second electrode array are located on the protrusion portions, respectively.

* * * * *